United States Patent

Berchem

Patent Number: 5,353,832
Date of Patent: Oct. 11, 1994

[54] BALL VALVE OR COCK

[75] Inventor: Rütger Berchem, Essen, Fed. Rep. of Germany

[73] Assignee: Cerpraecis Anwendungen fur Ingenieurkeramik GmbH, Gelsenkirchen, Fed. Rep. of Germany

[21] Appl. No.: 160,508

[22] Filed: Dec. 1, 1993

[30] Foreign Application Priority Data

Dec. 4, 1992 [DE] Fed. Rep. of Germany ... 9216543[U]

[51] Int. Cl.⁵ .................. F16L 7/00; F16K 25/00
[52] U.S. Cl. .................. 137/375; 251/174; 251/315 CE; 251/315 RC
[58] Field of Search ......... 137/375; 251/368, 315 CE, 251/174, 315 RC

[56] References Cited

U.S. PATENT DOCUMENTS

| 3,883,113 | 5/1975 | Kolb | 251/315 RC |
| 4,791,953 | 12/1988 | Berchem | 137/375 |
| 4,962,911 | 10/1990 | Soderberg | 251/174 |
| 5,205,533 | 8/1993 | Berchem | 137/375 |

Primary Examiner—A. Michael Chambers
Attorney, Agent, or Firm—Herbert Dubno

[57] ABSTRACT

A ball cock for fluids carrying abrasive materials has its inlet passage terminating with a smaller cross section than the mouth of a ball passage which, in turn, has a smaller cross section than the mouth of the outlet passage aligned therewith. The cross sectional differences exceed manufacturing and assembly tolerances and have been found to minimize wear of the ball cock.

9 Claims, 2 Drawing Sheets

BALL VALVE OR COCK

CROSS REFERENCE TO RELATED APPLICATIONS

The present application is related to the following copending applications and prior patents which may have been mutually copending and deal with ball valves and other valves adapted to be received in flow paths of media which have an abrasive character and to structures in such flow paths which may contain or be constructed of engineering ceramics.

U.S. Pat. No. 4,795,133, issued 3 Jan. 1989, Ser. No. 07/128,819, filed 4 Dec. 1987 entitled: BALL VALE WITH A CERAMIC VALVE AND CERAMIC SEAT RINGS;

U.S. Pat. No. 4,771,803, issued 20 Sep. 1988, Ser. No. 07/101,187, filed 25 Sep. 1987 entitled: BALL VALE WITH SINTER CERAMIC VALVE SEAT AND VALVE BALL;

U.S. Pat. No. 4,791,953, issued 20 Dec. 1988, Ser. No. 07/145,833, filed 20 Jan. 1988 entitled: REGULATOR AND SHUT-OFF VALVE FOR CORROSIVE MEDIA;

U.S. Pat. No. 4,815,704, issued 28 Mar. 1989, Ser. No. 07/222,189, filed 21 Jul. 1988 entitled: BALL VALVE;

U.S. Pat. No. 4,838,312, issued 13 Jun. 1989, Ser. No. 07/247,113, filed 20 Sep. 1988 entitled: THREE-WAY VALVE;

U.S. Pat. No. 4,932,432, issued 12 Jun. 1990, Ser. No. 07/307,383, filed 6 Feb. 1989 entitled: SHUTOFF AND FLOW-CONTROL VALVE;

U.S. Pat. No. 4,936,546, issued 26 Jun. 1990, Ser. No. 07/316,755, filed 28 Feb. 1989 entitled: FLOW SETTING VALVE;

U.S. Pat. No. 4,995,427, issued 26 Feb. 1991, Ser. No. 07/369,993, filed 22 Jun. 1989 entitled: PIPE SECTION, ESPECIALLY FOR ABRASIVE AND/OR CORROSIVE MATERIAL PIPELINES;

U.S. Pat. No. 4,968,004, issued 6 Nov. 1990, Ser. No. 07/400,244, filed 29 Aug. 1989 entitled: SHUTOFF AND CONTROL VALVE;

U.S. Pat. No. 5,052,445, issued 1 Oct. 1991, Ser. No. 07/589,089, filed 27 Sep. 1990 entitled: PIPE SECTION, ESPECIALLY FOR ABRASIVE AND/OR CORROSIVE MATERIAL PIPELINES;

U.S. Pat. No. 5,205,533, issued 27 Apr. 1993, Ser. No. 07/712,124, filed 7 Jun. 1991, entitled: BALL VALVE; and Ser. No. 07/963,578, filed 19 Oct. 1992, entitled: ASSEMBLY FOR THE CONTROL OF PRESSURE AND VOLUME FLOW OF A FLOWABLE MEDIUM.

FIELD OF THE INVENTION

My present invention relates to a ball valve and, more particularly, to a unit which can be used to close off flow of a fluid medium and generally is in the form of a ball valve or cock and is intended for liquid or gaseous fluid medium and specially a flowable medium which contains fine particles of solids, i.e. finely divided potentially abrasive solid materials.

BACKGROUND OF THE INVENTION

As can be gathered from the documents identified above, it is common practice in the control of fluid media to provide a ball valve or ball cock which can have a housing, an inlet passage and an outlet passage formed in the housing, a valve ball which can be provided with a passage, and a mechanism for rotating the ball to shift it between flow-permitting and flow-blocking positions. The ball can be received between seating rings which seal against the ball and in the flow-permitting position the aforementioned passages can be axially aligned. Usually the coaxial passages are of circular cross section.

Reference to a flowable medium here is intended to include not only a liquid which can entrain abrasive substances in a slurry or suspension, but also gaseous media such as gases and vapors which can entrain particulates.

In the fabrication and assembly of such ball valves, it is possible for offsets to occur between the passages as a result of fabrication and assembly tolerances. These offsets can result in the formation of free edges against which the flowable medium and any abrasives contained therein can impinge.

As a result, from a rheological point of view there can be pressure losses in addition to any flow-dependent wear which may detrimentally effect the life of the valves, its scaling effectiveness or the like. When these edges are involved in the sealing action, moreover, it cannot be excluded that the sealing function can fail.

These drawbacks are especially significant in applications in which the valve must constitute a so-called gate for the flow of solids, namely, in the control of gases which entrain solids like fly ash in connection with gas cleaning plants and the like.

OBJECTS OF THE INVENTION

It is, therefore, the principal object of the present invention to provide a flow controlling device, especially a ball valve which is so constructed that the described drawbacks of manufacturing and assembly tolerances offsets or set backs cannot arise or the effects thereof can be minimized.

A further object of the invention is to provide a long life ball valve which can be employed in an abrasive environment for flowable media of all types, which will be free from the aforedescribed drawbacks.

Still another object of the invention is to provide an improved ball valve which has minimal abrasive wear.

SUMMARY OF THE INVENTION

These objects and others which will become apparent hereinafter are attained, in accordance with the invention by intentionally creating offsets in the path of the flow of the flowable medium but so arranged that wear will be minimized and the detrimental effect of abrasive materials can be reduced.

According to the invention this is achieved by providing the inlet passage of the housing so that it opens into the ball section with a smaller cross section than that which the ball passage begins, the ball passage opens into the outlet passage of the valve with a smaller cross section than that at which the outlet passage begins, and the ball is pressed against the seating rings under a resilient force, i.e. a spring force. The cross sectional difference between the inlet segment and the ball passage and the cross sectional difference between the wall passage and the outlet section are both greater than any offset or set back resulting from the fabrication and assembly tolerances of the parts.

According to the invention, the ball can be provided with a pin journaling system but preferably is arranged to somewhat float between the seats.

The inlet and outlet passages can include, in accordance with the invention, the bores of any seating rings which can form the seats.

In a preferred configuration of the invention the cross section of the inlet passage converges toward its downstream end conically. While the ball passage can be conically convergent and/or the outlet passage can be conically convergent it is preferred that the ball passage is cylindrical.

More particularly, a ball valve in accordance with the invention can comprise:

a housing;

means in the housing forming an inlet passage for the flowable medium;

a valve ball in the housing adjacent the inlet passage and having a ball passage communicating with the inlet passage upon alignment of the ball passage with the inlet passage in a flow-permitting position of the ball, the valve ball being rotatable in the housing to disalign the ball passage from the inlet passage into a flow-blocking position of the ball;

means forming an outlet passage in the housing, the outlet passage being aligned with the ball passage in the flow-permitting position of the ball, the ball being sealingly engaged between seating rings defining a downstream end of the inlet passage and an upstream end of the outlet passage, respectively;

spring means in the housing for resiliently engaging the ball between the seats; and control means in the housing coupled with the ball and actuatable from an exterior of the housing to rotate the ball between the positions, the inlet passage opening at the downstream end into the ball passage at a smaller flow cross section than that of the ball passage at a mouth thereof, the ball passage opening at a downstream end thereof into the outlet passage at the upstream end with a smaller flow cross section than the flow cross section of the upstream end of the outlet passage, and differences of flow cross section between the downstream end of the inlet passage and the mouth of the ball passage and between the downstream end of the ball passage and the upstream end of the outlet passage exceeding manufacturing and assembly tolerances in the housing.

The valve of the invention can be composed of different materials depending upon the stresses to be withstood by the valve although it is preferred to form the aforementioned passages, the seating rings, the entire ball and all other parts or components which come into contact with the flowable material of engineering ceramic. The edges which form the cross sectional differences described above are preferably mounted.

The engineering ceramics which can be used in accordance with the invention include those of the aforementioned patents. Specific mention may be made of silicon carbide, silicon nitride, tungsten carbide and titanium carbide ceramics.

With the system of the invention, the wear caused by the interaction of fabrication and assembly or mounting tolerance offsets and abrasive fluids can be eliminated in a simple manner.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
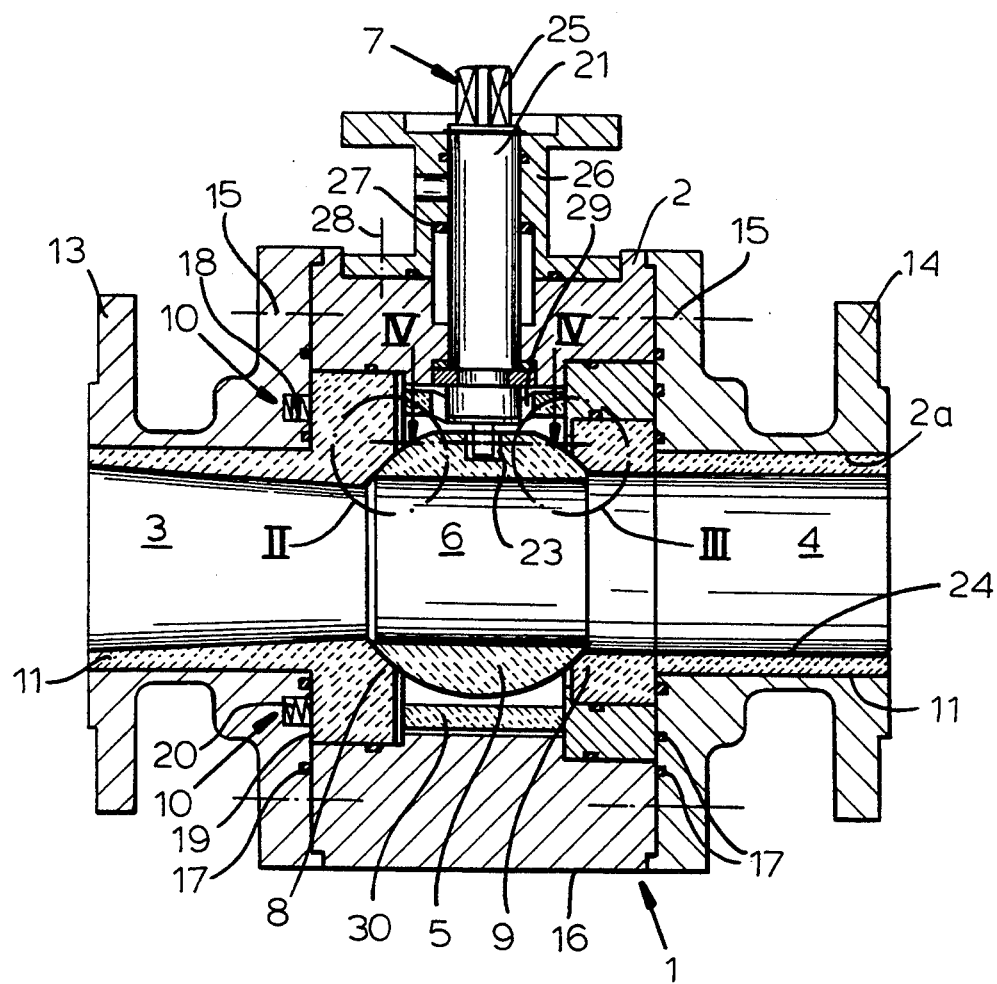
FIG. 1 is a cross sectional view through a ball valve embodying the invention showing the flow passages aligned in the flow-permitting position.
Figure 2:
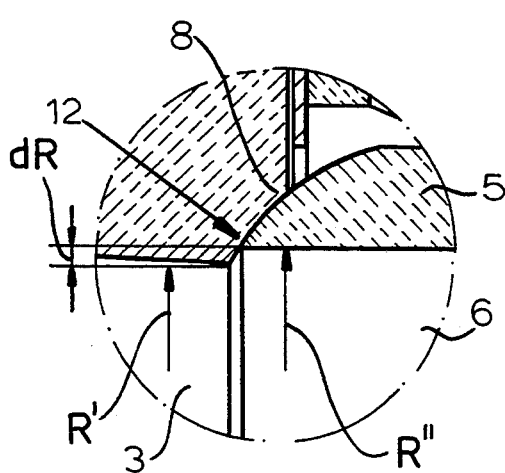
FIG. 2 is a detailed section greatly enlarged of the region II of FIG. 1.
Figure 3:
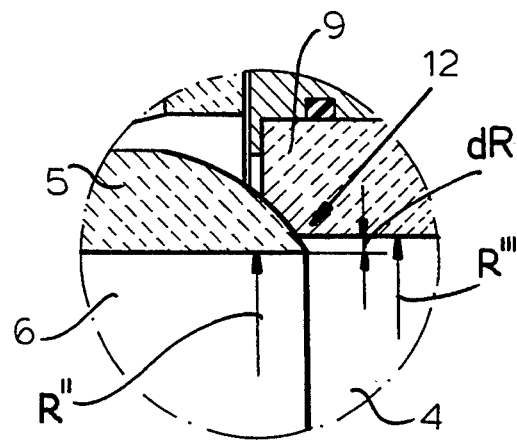
FIG. 3 is a detail of the region III of FIG. 1 also drawn to an enlarged scale.
Figure 4:
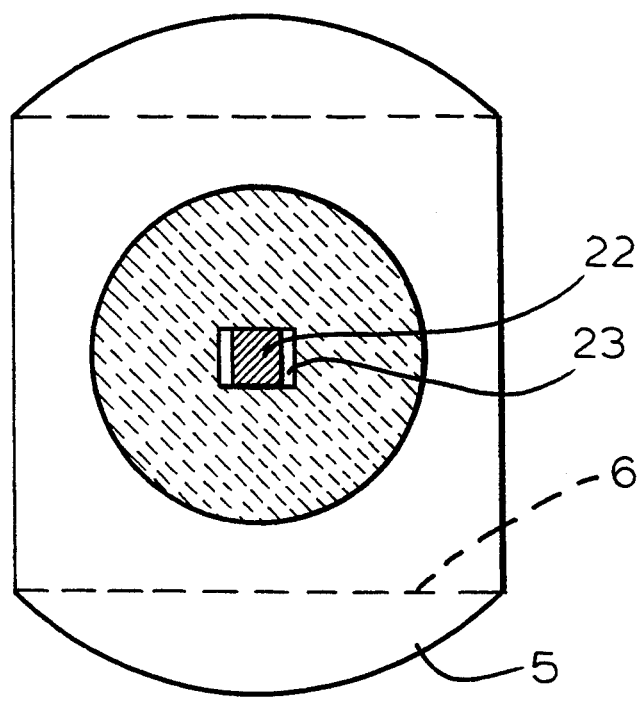
FIG. 4 is a cross sectional view taken along the line IV—IV of FIG. 1 but drawn to a larger scale.

The ball valve 1 shown in FIGS. 1-3 is suitable for controlling liquid or gaseous flowable media. A gaseous medium in the sense of the invention also includes vapors. The flow-control unit is specifically adapted for a flowable medium which carries finely divided solids, e.g. fly ash.

Basically the apparatus includes a housing 2 provided with a flow pathway 2a including an inlet section formed with an inlet passage 3, an outlet section formed with outlet passage 4 and a valve bore 5 with a ball passage 6. The device also includes an actuating member 7 for the ball 6. The ball 5 is disposed between seating rings 8 and 9 and these rings and the passages 3, 4 and 6 are coaxial with one another.

The coaxial assembly is effected with the usual tolerances and the passages 3, 4 and 6 are customarily of circular cross section.

The inlet passage 3 opens at the ball passage 6 with a smaller cross section than that to the upstream side of the ball passage. The ball passage 6, in turn, opens into the outlet passage 4 with a smaller cross section than that of the upstream side of the passage. The ball 5 is engaged by the seating rings 8 and 9 with a resilient force which can be contributed by a spring arrangement 10.

The cross sectional differences dR between the cross sections R' and R'' and between R'' and R''' of the parts, with reference to the respective radii, is significantly greater than the fabrication tolerance or assembly tolerance offsets between the parts. It will be understood that, in the sense of the invention the reference to the inlet passage 3 and the outlet passage 4 also includes the bores of the respective seating rings.

From FIG. 1 it will be apparent that the cross section of the inlet passage 3 conically converges toward its downstream end. The ball passage 6, however, is cylindrical.

Figures 5, 6:
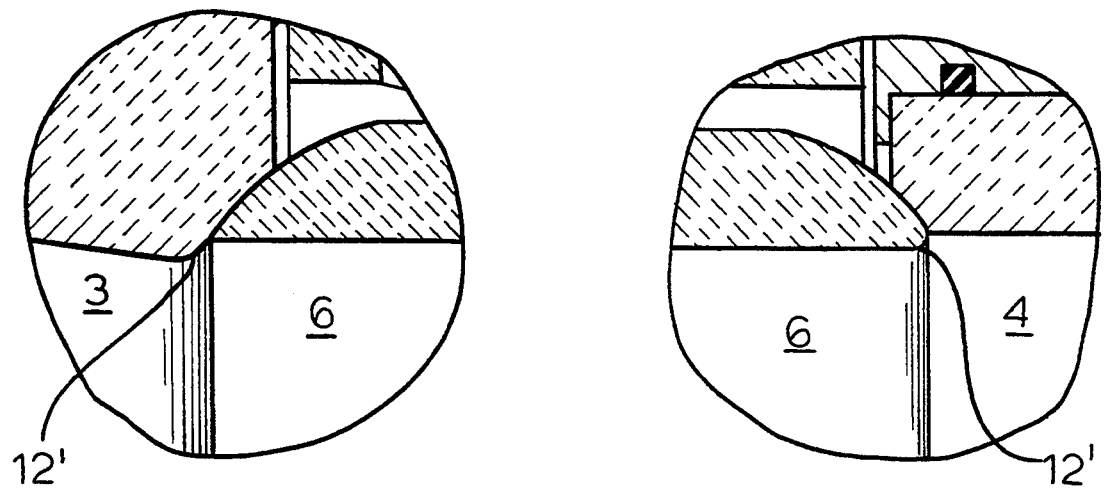
FIGS. 5 and 6 are views similar to FIGS. 2 and 3 but illustrating another embodiment of the valve.

The drawing also shows that the housing passages 3 and 4 in the components 11, the seating rings 8 and 9 and the ball 5 are all composed of engineering ceramic and, indeed, all of the parts of the valve which may come into contact with the flowable medium are composed of ceramic. As can be seen from FIGS. 2 and 3, the edges which project inwardly at 12 because of the cross sectional differences dR described are sharp whereas in FIGS. 5 and 6 the corresponding edges 12' are rounded. The invention is applicable to ball valves of all nominal or standard sizes.

From FIG. 1 it will be apparent that the housing 2 comprises flanged housing sections 13 and 14 for connection in a pipeline, the axes 15 representing bolts securing the flange sections 13 and 14 to an annular housing body 16 via sealing rings 17. The spring means 10 can comprise blind bores 18 formed in the flanged section 13 and bearing upon a flange shoulder 19 forming one of the seating rings 8. Coil springs 20 in the blind bores 19 bear upon that shoulder and urge that shoulder axially against the ball 5. The ball 5, in turn, is connected to the stem 21 of the actuator by a polygonal section 22 allowing play in the cavity 23 of the ball so that the ball can float and thus, by the springs 20 be resiliently biased against the seating ring 9. The latter forms the passage 4 together with a cylindrical sleeve 24 of the engineering ceramic.

The stem 21 has a polygonal head 25 receiving a wrench or handle and protruding from a packing body 26 receiving a seal 27 bearing on the stem and secured by bolts provided at 28 to hold the packing body against member 16.

The stem 21 can pass through a hole 29 in a ring 30 surrounding the ball but allowing the axial play of members 6 and 8 to ensure the resilient bracing of the rings 8 and 9 against the ball 6.

I claim:

1. A ball valve for control of a flowable medium containing finely divided solids, comprising:
   a housing;
   means in said housing forming an inlet passage for said flowable medium;
   a valve ball in said housing adjacent said inlet passage and having a ball passage communicating with said inlet passage upon alignment of said ball passage with said inlet passage in a flow-permitting position of said ball, said valve ball being rotatable in said housing to disalign said ball passage from said inlet passage into a flow-blocking position of said ball;
   means forming an outlet passage in said housing, said outlet passage being aligned with said ball passage in said flow-permitting position of said ball, said ball being sealingly engaged between seating rings defining a downstream end of said inlet passage and an upstream end of said outlet passage, respectively;
   spring means in said housing for resiliently engaging said ball between said seats; and
   control means in said housing coupled with said ball and actuatable from an exterior of said housing to rotate said ball between said positions,
   said inlet passage opening at said downstream end into said ball passage at a smaller flow cross section than that of said ball passage at a mouth thereof,
   said ball passage opening at a downstream end thereof into said outlet passage at said upstream end with a smaller flow cross section than the flow cross section of said upstream end of said outlet passage, and
   differences of flow cross section between said downstream end of said inlet passage and said mouth of said ball passage and between said downstream end of said ball passage and said upstream end of said outlet passage exceeding manufacturing and assembly tolerances in said housing.

2. The ball valve defined in claim 1 wherein said inlet passage conically converges toward said downstream end of said inlet passage.

3. The ball valve defined in claim 1 wherein said ball passage is cylindrical.

4. The ball valve defined in claim 1 wherein said inlet passage, said ball passage and said outlet passage are formed of engineering ceramic.

5. The ball valve defined in claim 4 wherein all parts in said housing contacted by said fluid medium are composed of engineering ceramic.

6. The ball valve defined in claim 5 wherein said inlet passage has a rounded edge adjoining said ball passage and said ball passage has a rounded edge adjacent said outlet passage.

7. The ball valve defined in claim 6 wherein said inlet passage conically converges toward said downstream end of said inlet passage.

8. The ball valve defined in claim 7 wherein said ball passage is cylindrical.

9. The ball valve defined in claim 1 wherein said inlet passage has a rounded edge adjoining said ball passage and said ball passage has a rounded edge adjacent said outlet passage.

* * * * *